Patented Nov. 18, 1924.

1,515,976

UNITED STATES PATENT OFFICE.

LINA STERN AND FRÉDÉRIC BATTELLI, OF GENEVA, SWITZERLAND.

PROCESS FOR IMPARTING TO INTERNALLY-SECRETING GLANDS, SEPARATED FROM THE ORGANISM, A RELATIVELY LARGE QUANTITY OF ACTIVE SUBSTANCES.

No Drawing.    Application filed November 19, 1923.    Serial No. 675,787.

*To all whom it may concern:*

Be it known that we, LINA STERN, a citizen of Russia, and FRÉDÉRIC BATTELLI, a subject of the King of Italy, both residing at Geneva, Canton of Geneva, in the Confederation of Switzerland, have invented certain new and useful Improvements in processes for imparting to internally-secreting glands, separated from the organism, a relatively large quantity of active substances, of which the following is a specification.

The employment of extracts of internally secreting glands for the study of hormones has given negative results for the majority of glands. A relatively small number of glands have yielded extracts producing results characteristic of hormones. The other glands, on the contrary, have yielded extracts in which it was impossible to detect the presence of specific hormone.

This difference in the manner in which different glandular extracts behave may be explained by the fact that some glands such as the thyroid gland, supra-renal capsules and hypophysis possess a reserve of hormone. Also their extracts exhibit actions characteristic of hormones.

The majority of endocrine glands, on the contrary, do not possess a reserve of hormone, the product of secretion being eliminated as it is formed. The gland does not contain any or few from the moment it is separated, this accounting for the inefficacy of its extracts.

It has been found that better results may be obtained by replacing the extracts hitherto prepared by the product of secretion of the glands in question obtained by causing the gland separated from the organism to survive in a suitable medium.

The present invention relates precisely to a process for imparting to internally secreting glands separated from the organism a relatively large quantity of active substances (hormones).

According to this process these glands, separated from the organism at a temperature of about 40° C. and in the presence of oxygen, are caused to subsist in a nutritive liquid in which the active substance accumulates as fast as it is secreted by the gland.

The nutritive liquid may be formed, for example, by the blood derived from an animal of the same species as that from which the gland is derived or by a usual physiological liquid.

The gland may be caused to subsist in the nutritive liquid by dividing it into small pieces and suspending these latter in the said liquid or even the whole gland may be subjected to artificial circulation with the nutritive liquid. In both cases the active substances of secretion which are produced in a continuous manner as long as the gland lives, which, according to the nature thereof, may continue from 2 to 24 hours, accumulate in the nutritive liquid in which the glandular tissue welters. This liquid may therefore be used with advantage instead of the extracts which hitherto have proved inefficacious. It may serve as the starting point for the subsequent preparation of organo-pharmaceutical products according to known methods.

The new process permits of obtaining a larger quantity of hormones with the same quantity of glands than by the extraction processes hitherto used.

The following is an example of the procedure which may be followed, according to the present invention, for obtaining adrenalin:—

Supra-renal capsules taken from an animal as quickly as possible after its death are cut into thin slices and suspended in blood obtained from the same animal. The mixture is maintained at a temperature of 40° C. and a stream of oxygen is passed therethrough. The particles of glands secrete hormone which, in this case, is adrenalin; this secretion continues as long as the glands live. The quantity of adrenalin obtained is consequently larger than that which would be obtained by simple extraction according to the usual methods.

The adrenalin is isolated according to the known methods.

Good results are obtained as well with supra-renal capsules of a dog as with those of a bull removed very quickly after the death of the animal.

What we claim and desire to secure by Letters Patent is:—

1. A process for imparting to internally secreting glands separated from the organism a relatively large quantity of active substances (hormones), consisting in causing the glands, separated from the organism at a temperature of about 40° C. and in the presence of oxygen, to subsist in the blood derived from an animal of the same species as that from which the gland was derived.

2. A process for imparting to internally secreting glands separated from the organism a relatively large quantity of active substances (hormones), consisting in causing the glands, separated from the organism at a temperature of about 40° C. and in the presence of oxygen, to subsist in a nutritive liquid in which the active substance accumulates as fast as it is secreted by the gland, and subjecting the gland to artificial circulation in the nutritive liquid.

3. A process for imparting to internally secreting glands separated from their parent organism a relatively large quantity of hormones, consisting in suspending the glands quickly after separation in a nutritive liquid, maintaining the mixture at a temperature of about 40° C., and passing a stream of oxygen therethrough.

4. A process for imparting to internally secreting glands separated from an animal a relatively large quantity of hormones, consisting in immersing the glands quickly after separation in blood obtained from an animal of the same species, maintaining the mixture at a temperature of about 40° C., and passing a stream of oxygen therethrough.

5. A process for imparting to internally secreting glands separated from an animal a relatively large quantity of hormones, consisting in cutting the glands into slices and suspending them quickly after separation into blood derived from the same animal, maintaining the mixture at a temperature of about 40° C., and passing a stream of oxygen therethrough.

6. A process for obtaining separated from their parent organism internally secreting glands having a relatively large quantity of hormone, consisting in causing the separated glands to subsist in a nutritive liquid in which the active substance accumulates as fast as it is secreted by the gland, and then isolating the product rich in hormone.

7. The process of obtaining adrenalin consisting in separating the supra-renal capsules of an animal as quickly as possible after its death, cutting them in slices, suspending them in a quantity of the blood of the animal, maintaining the mixture at a temperature of about 40° C. and passing oxygen therethrough as long as the glands continue to live, and finally isolating the resultant adrenalin.

In testimony whereof we have affixed our signatures in presence of two witnesses.

LINA STERN.
FRÉDÉRIC BATTELLI.

Witnesses:
ROD. DE WURSTEMBERGER,
MAURICE IMER.